US012566311B2

(12) United States Patent
Diemer et al.

(10) Patent No.: US 12,566,311 B2
(45) Date of Patent: Mar. 3, 2026

(54) ADJUSTMENT DEVICE FOR ADJUSTING OPTICAL COMPONENTS OF AN OPTICAL INSTRUMENT AND DEVICE ARRANGEMENT

(71) Applicant: KARL STORZ SE & CO. KG, Tuttlingen (DE)

(72) Inventors: Carolin Diemer, Tuttlingen (DE); Magnus Dressnandt, Tuttlingen (DE); Jonas Forster, Tuttlingen (DE); Patricia Gallace, Tuttlingen (DE); Andreas Heni, Tuttlingen (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 328 days.

(21) Appl. No.: 18/339,595

(22) Filed: Jun. 22, 2023

(65) Prior Publication Data

US 2023/0418024 A1 Dec. 28, 2023

(30) Foreign Application Priority Data

Jun. 23, 2022 (DE) ..................... 10 2022 115 716.4

(51) Int. Cl.
*G02B 7/182* (2021.01)
*G02B 7/00* (2021.01)

(52) U.S. Cl.
CPC ........... *G02B 7/1825* (2013.01); *G02B 7/004* (2013.01)

(58) Field of Classification Search
CPC ....... G02B 7/1825; G02B 7/004; G02B 7/023
USPC ......................................................... 359/896
See application file for complete search history.

(56) References Cited

U.S. PATENT DOCUMENTS

| | | | |
|---|---|---|---|
| 6,191,898 B1 | 2/2001 | Trunz et al. | |
| 2003/0035229 A1* | 2/2003 | Willis | .................... G02B 7/004 |
| | | | 359/819 |
| 2006/0169866 A1* | 8/2006 | Vermeulen | ............... F16M 7/00 |
| | | | 248/677 |
| 2011/0185831 A1 | 8/2011 | Kozak | |

(Continued)

FOREIGN PATENT DOCUMENTS

| | | | | |
|---|---|---|---|---|
| CN | 114929070 A | * | 8/2022 | ........... A47B 88/956 |
| CN | 120117331 A | * | 6/2025 | |

(Continued)

OTHER PUBLICATIONS

German Office Action, Application No. 10 2022 115 716.4, dated Jan. 16, 2023.

*Primary Examiner* — Tarifur R Chowdhury
(74) *Attorney, Agent, or Firm* — Honigman LLP

(57) ABSTRACT

The disclosure relates to an adjustment device for adjusting optical components of an optical instrument, having at least one adjustment screw via which the optical component arranged on a carrier is able to be fixed in an exact position relative to another component of the optical instrument. The adjustment screw includes an outer thread, and has a spring elasticity in a radial direction such that the adjustment screw is able to be fixed by being clamped with its outer thread in an inner thread of the carrier or of the other component wherein a screw tip is on the other component or the carrier. The disclosure further relates to a device arrangement for adjusting optical components of an optical instrument, having an adjustment device with at least one adjustment screw.

8 Claims, 1 Drawing Sheet

(56)  References Cited

U.S. PATENT DOCUMENTS

| 2014/0301802 A1 | * | 10/2014 | Kozak | F16B 29/00 |
| | | | | 411/55 |
| 2017/0235085 A1 | | 8/2017 | Erbe et al. | |
| 2021/0223495 A1 | * | 7/2021 | Chen | G02B 7/1822 |

FOREIGN PATENT DOCUMENTS

| CN | 223005704 | U | * | 6/2025 | |
| DE | 19816672 | A1 | | 11/1998 | |
| DE | 19851355 | A1 | | 5/1999 | |
| DE | 102016102469 | B3 | | 12/2016 | |
| DE | 102015118199 | A1 | * | 4/2017 | H04N 13/239 |
| EP | 3376273 | A2 | * | 9/2018 | A61B 1/00193 |
| SU | 1379759 | A1 | | 3/1988 | |
| SU | 1578678 | A1 | | 7/1990 | |
| WO | WO994662 | | * | 9/1999 | G02B 7/004 |
| WO | WO-2004015320 | A1 | * | 2/2004 | F16L 5/06 |
| WO | 2016119778 | A1 | | 8/2018 | |

* cited by examiner

Fig. 1
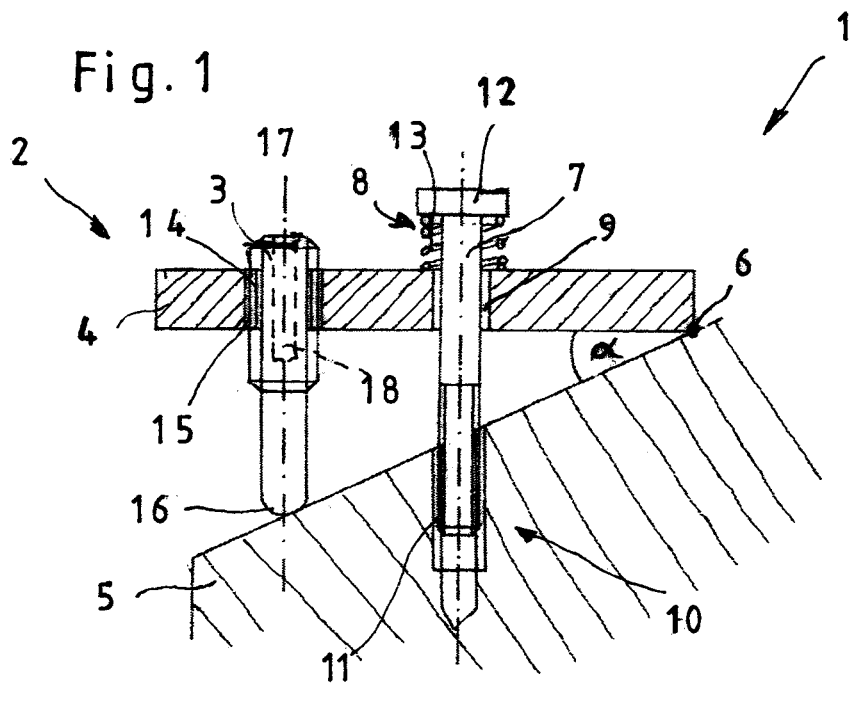
Fig. 2
Fig. 3
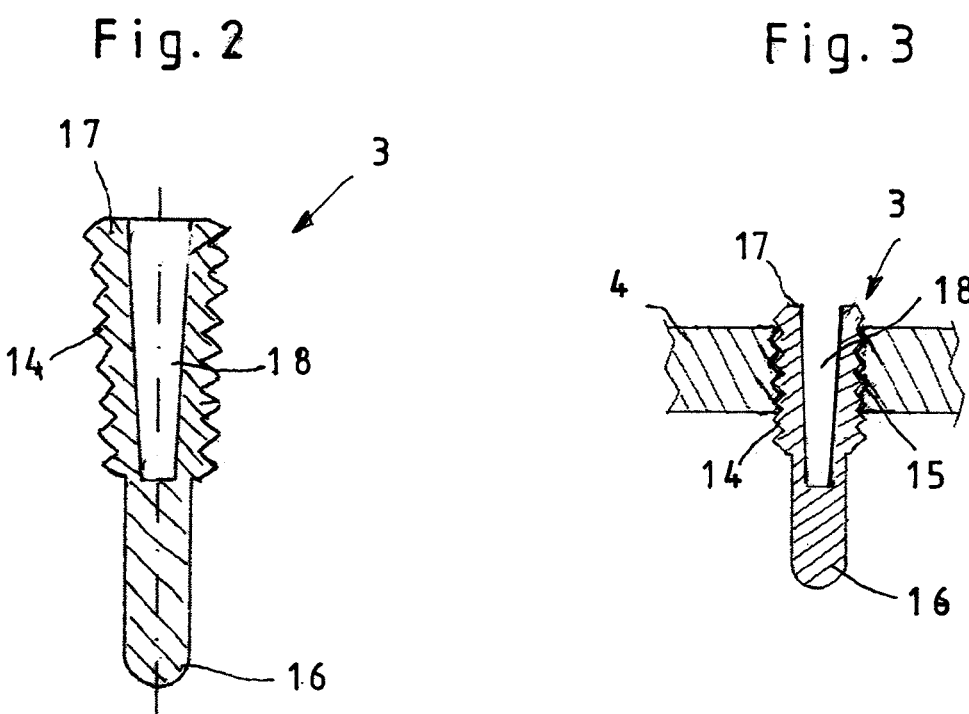

ADJUSTMENT DEVICE FOR ADJUSTING OPTICAL COMPONENTS OF AN OPTICAL INSTRUMENT AND DEVICE ARRANGEMENT

CROSS-REFERENCE TO RELATED APPLICATIONS

This application claims priority of German Patent Application No. DE102022115716.4 filed on Jun. 23, 2022, the contents of which are incorporated herein.

TECHNICAL FIELD

The disclosure relates to an adjustment device for adjusting optical components of an optical instrument, having at least one adjustment screw via which the optical component arranged on a carrier is able to be fixed in an exact position relative to another component of the optical instrument. The disclosure further relates to a device arrangement for adjusting optical components, having an adjustment device with at least one adjustment screw.

BACKGROUND

The optical components, for example mirrors, image sensors and the like, of optical instruments have to be exactly positioned within the optical instrument in order to be able to deflect optical rays correctly or, in the case of the image sensors, in order to be able to exactly capture the optical rays.

The adjustment of the optical components arranged on a carrier within the optical instrument is in practice effected by means of adjustment screws via which the carrier provided with the optical component is aligned and fixed relative to another component of the optical instrument. The play which is present, even in the case of fine threads, between the outer thread of the adjustment screw and the inner thread receiving the adjustment screw may affect the adjustment process in an undesired way. For example, in iterative adjustment steps, hysteresis occurs, or else the play may lead to the previously set adjustment position being lost in the event of vibrations during the subsequent operation of the optical instrument.

In order to prevent unwanted loss of the adjustment position of an adjustment screw, it is known from DE 10 2016 102 469 B3 to provide an adjustment screw with a longitudinal bore which extends along the full length of the adjustment screw and which is to be filled with an adhesive. By means of the adhesive emerging from the adjustment screw again at the screw tip, the adjustment screw is adhesively bonded, secure against rotation, to the component that is to be adjusted. A disadvantage of this known adjustment procedure is that, on the one hand, the adjustment screw can be used only once, since the longitudinal bore is blocked with the adhesive, and, on the other hand, once the adjustment is lost, the adhesive residues first have to be removed with difficulty before a renewed adjustment.

Proceeding from this, the problem addressed by the disclosure is to make available an adjustment device of the type mentioned at the outset which, while being easy to handle, ensures reliable adjustment of the optical components within the optical instrument.

SUMMARY

According to the disclosure, the solution to this problem is characterized in that the adjustment screw, provided at least in part with an outer thread, is designed to have spring elasticity in a radial direction, seen in cross section, such that the adjustment screw is able to be fixed by being clamped with its outer thread in an inner thread of the carrier or of the other component, and that the adjustment screw is mounted with a screw tip on the other component or the carrier.

The radial spring elasticity of the adjustment screw causes the outer thread of the adjustment screw to at least partially wedge with the inner thread receiving the adjustment screw, as a result of which a possible play between the two threads is completely compensated.

According to a preferred embodiment of the disclosure, it is proposed that, in order to provide the radial spring elasticity, at least one slit is formed in the adjustment screw, which slit starts from the screw head and extends in the longitudinal direction as far as the screw tip and is radially outwardly open at least on one side.

Depending on the material of the adjustment screw, the formation of the longitudinal slit alone, on account of the inherent elasticity of the screw material, brings about a radial expansion of the parts of the screw shaft that are separated from each other by the slit. In the case of stiffer materials, the radial expansion of the slit can also take place exclusively mechanically, or can be mechanically assisted, for example by the insertion and wedging of a screwdriver. When an adjustment screw modified and radially expanded by means of the longitudinal slit is screwed into the associated inner thread, there is therefore always a pretensioning, such that a thread play that is initially present is completely compensated. The adjustment screw can be made from metal or from a plastic material. The screw is in particular formed in one piece.

The slit extends in the longitudinal direction from the outer surface of the screw head to the screw tip. The slit passes through the adjustment screw only in part in the longitudinal direction; the adjustment screw is in particular closed in the region of its tip. For example, the slit in particular extends centrally through the adjustment screw in the portion that has the outer thread. However, the slit can also be shorter or can extend beyond this portion as far as the tip. The slit can have an approximately rectangular cross section and, before being screwed in, can have a constant cross section along its length. Alternatively, the slit can taper toward the screw tip, i.e. the cross section can become smaller.

In a practical embodiment of the disclosure, it is proposed that the at least one slit is configured as a straight or angled slit. The exact shape of the slit has no particular effect on the radial spring elasticity. The important things are the formation of the longitudinal slit and the inherent elasticity of the screw material, which bring about the radial expansion.

As an alternative to the formation of just one slit, it is further proposed by the disclosure that two intersecting slits can be formed in the adjustment screw. Here too, the separation of the shaft parts of the adjustment screw by the two intersecting slits brings about the radial expansion of the diameter of the adjustment screw, which brings about the clamping, free of play, when the screw is screwed into the inner thread.

In order to obtain a very high degree of radial spring elasticity, it is proposed in a preferred embodiment of the disclosure that the at least one slit is radially outwardly open on at least two sides. This radial opening on at least two sides or in particular on all sides of the slit or slits permits full exploitation of the resiliently elastic properties of the material of the adjustment screw. The slit thus passes through the outer wall of the adjustment screw, for example on opposite sides, and thus divides the adjustment screw in the longitudinal direction in that portion in which the slit extends.

According to an alternative embodiment of the disclosure, the radial spring elasticity of the adjustment screw is utilized such that the screw shaft of the adjustment screw is radially inwardly compressible in the region of the longitudinal slit. In this connection, it is proposed according to the disclosure that the diameter of the adjustment screw is greater in the region of the at least one slit than the internal diameter of the inner thread into which the adjustment screw is able to be screwed. When such an adjustment screw, modified with a radial oversize and radially compressible in the region of the slit, is screwed into the associated inner thread, there is therefore always a pretensioning present on account of the radial spring elasticity, and therefore a thread play that is initially present is completely compensated.

If so required, the adjustment screw can be additionally fixed in an adjustment position by wedging, for example by permanent insertion of a suitably dimensioned part into the slit of the adjustment screw. This part can be a pin or a further screw, these being introduced into the slit. Other parts such as washers can be provided which, when pressed from above onto the adjustment screw, cause the latter to expand and wedge in the thread of the carrier or of the other component.

Finally, the disclosure proposes a device arrangement for adjusting optical components of an optical instrument, having an adjustment device with at least one adjustment screw, wherein the carrier, on which the optical component is arranged, and the other component of the optical instrument, with respect to which the optical component is able to be fixed in an exact position, are arranged to be pivotable relative to each other. The adjustment device is an adjustment device as described above.

By means of the adjustment screw being screwed in and out, the device arrangement allows the angle between the other component and the carrier, pivotable with respect to the latter, to be adjusted exactly and free of play.

To form the device arrangement, it is proposed according to the disclosure that the carrier and the other component are connected to each other via a connection screw, wherein the connection screw is mounted with a screw-head end in a through-bore in the carrier or in the other component and is screwed with a screw-tip end into an inner thread of the other component or of the carrier, and the screw head of the connection screw is supported on the carrier or on the other component via a spring element, and wherein the adjustment screw is screwed with its outer thread into an inner thread in the component of the optical instrument provided with the through-bore for the connection screw, namely the carrier or the other component, and bears with its screw tip on the other component or the carrier. For this purpose, the connection screw and the adjustment screw are each suitably dimensioned in terms of their length.

By means of the spring element arranged coaxially on the connection screw, the components that are to be positioned relative to each other, namely the carrier of the optical components and the other component, are pretensioned relative to each other. The spring force likewise acts on the adjustment screw, via which the two components are movable toward or away from each other.

The spring element is designed in particular as a helical spring, leaf spring or other resilient part known to a person skilled in the art.

BRIEF DESCRIPTION OF DRAWINGS

Further features and advantages of the disclosure will become clear from the associated drawings in which an exemplary embodiment of an adjustment device for adjusting optical components of an optical instrument is shown solely by way of example, without limiting the disclosure to this exemplary embodiment. In the drawings:

FIG. 1 shows a schematic sectional view of a device arrangement according to the disclosure for adjusting optical components of an optical instrument;

FIG. 2 shows a schematic longitudinal section through an adjustment screw before the latter is installed in an adjustment device; and FIG. 3 shows a schematic longitudinal section illustrating the adjustment screw from FIG. 2 in a position in which it has been screwed into an adjustment device.

DETAILED DESCRIPTION OF PREFERRED EMBODIMENTS

FIG. 1 is a schematic sectional view showing the structure of a device arrangement 1 for adjusting optical components of an optical instrument. As its main part, the device arrangement 1 comprises an adjustment device 2 with at least one adjustment screw 3.

The optical components, for example mirrors or image sensors of optical instruments, have to be exactly positioned within the optical instrument in order to be able to deflect optical rays correctly or, in the case of the image sensors, in order to be able to exactly capture the optical rays.

The optical components, arranged on a carrier 4 within the optical instrument, are adjusted by means of adjustment screws 3 via which the carrier 4 provided with the optical component is aligned and fixed relative to another component 5 of the optical instrument. This other component 5, with respect to which the carrier 4 provided with the optical component has to be aligned, can for example be a main body of the optical instrument.

As can be seen from FIG. 1, the carrier 4, provided with the optical component, and the other component 5, with respect to which the carrier 4 and thus also the optical component have to be adjusted and fixed in an exact position, are mounted on each other pivotably about a pivot axis 6, as a result of which a pivot angle α is spanned between the two components pivotable with respect to each other, i.e. the carrier 4 and the other component 5.

In the embodiment of the device arrangement 1 shown in FIG. 1, the carrier 4 and the other component 5 are connected to each other via a connection screw 7, wherein the connection screw 7 is mounted with a screw-head end 8 in a through-bore 9 in the carrier 4 and is screwed with a screw-tip end 10 into an inner thread 11 of the other component 5.

As will also be seen, the screw head 12 of the connection screw 7 is supported on the carrier 4 via a spring element 13, wherein the spring element 13 is arranged coaxially on the shaft of the connection screw 7.

The adjustment screw 3, serving to adjust the pivot angle α, is screwed with its outer thread 14 into an inner thread 15 in the component of the optical instrument provided with the through-bore 9 for the connection screw 7, namely the carrier 4, and bears with its screw tip 16 on the other component 5 functioning as abutment.

By means of the spring element 13 arranged coaxially on the connection screw 7, the components to be positioned relative to each other, namely the carrier 4 of the optical components and the other component 5, are pretensioned relative to each other. The spring force of the spring element 13 likewise acts on the adjustment screw 3, via which the two components 4 and 5 are movable toward each other or away from each other in order to set the desired pivot angle α.

To compensate for a thread play between the outer thread 14 of the adjustment screw 3 and the inner thread 15 into which the adjustment screw 3 is screwed, a slit 18 is formed in the adjustment screw 3, as can be seen in particular from FIGS. 2 and 3, which slit 18 starts from the screw head 17 and extends in the longitudinal direction as far as the screw tip 16 and is radially outwardly open at least on one side.

Depending on the material of the adjustment screw 3, the formation of the slit 18 alone, on account of the inherent elasticity of the screw material, brings about a radial expansion of the parts of the screw shaft that are separated from each other by the slit 18. In the case of stiffer materials, the radial expansion of the slit 18 can also take place exclusively mechanically, or can be mechanically assisted, for example by the insertion and wedging of a screwdriver.

When an adjustment screw 3 modified and radially expanded by means of the longitudinal slit 18 is screwed into the associated inner thread 15, there is therefore always a pretensioning between the outer thread 14 of the adjustment screw 3 and the associated inner thread 15, such that a thread play that is initially present is completely compensated.

The length of the slit 18 starting from the screw head 17 is to be dimensioned such that there is a sufficient radial spring elasticity of the adjustment screw 3 in the region of the slit 18 to ensure reliable and permanent clamping of the outer thread 14 of the adjustment screw 3 in the inner thread 15. The length of the inner thread 15 into which the adjustment screw 3 is screwed can be a measure for the length of the slit 18 that is to be formed in the adjustment screw 3.

Since the carrier 4 and the other component 5 are spring-loaded relative to each other via the spring element 13 arranged on the connection screw 7 and, moreover, the adjustment screw 3 screwed into the carrier 4 is supported with its screw tip 16 on the other component 5 as abutment, the pivot angle α can be set very precisely by a rotation of the adjustment screw 3, and, on account of the radial spring elasticity conferred on the adjustment screw 3 by the slit 18, can also be fixed reliably and free of play in the desired position.

The arrangement of the connection screw 7 and of the adjustment screw 3 as shown in FIG. 1 is only an example. The device arrangement 1 can of course also be designed such that the carrier 4 and the other component 5 are connected to each other via a connection screw 7, wherein the connection screw 7 is mounted with a screw-head end 8 in a through-bore 9 in the other component 5 and is screwed with a screw-tip end 10 into an inner thread 11 of the carrier 4. In this alternative form of arrangement, the screw head 12 of the connection screw 7 is supported on the other component 5 via a spring element 13.

In this alternative form of arrangement, the adjustment screw 3 serving to set the pivot angle α is screwed with its outer thread 14 into an inner thread 15 in the other component 5 provided with the through-bore 9 for the connection screw 7 and bears with its screw tip 16 on the carrier 4 functioning as abutment.

The at least one slit 18 formed in the adjustment screw 3 can be configured as a straight or angled slit. The shape of the slit 18 has no particular effect on the radial spring elasticity. The important thing is that a radial spring elasticity of the adjustment screw 3 is achievable through the formation of the slit 18.

As an alternative to the formation of just one slit 18, it is also possible for two intersecting slits 18 to be formed in the adjustment screw 3. Here too, the separation of the shaft parts of the adjustment screw 3 by the two intersecting slits 18 brings about the radial expansion of the diameter of the adjustment screw 3, which brings about the clamping, free of play, when the screw is screwed into the inner thread 15.

In order to obtain a very high degree of radial spring elasticity, the at least one slit 18 formed in the adjustment screw 3 is radially outwardly open on at least two sides. This radial opening on at least two sides or in particular on all sides of the slit 18 or slits 18 permits full exploitation of the resiliently elastic properties of the material of the adjustment screw 3.

According to an alternative embodiment, the radial spring elasticity conferred on the adjustment screw 3 by the at least one slit 18 can also be utilized such that the screw shaft of the adjustment screw 3 is radially inwardly compressible in the region of the slit 18.

In this embodiment, the diameter of the adjustment screw 3 in the region of the at least one slit 18 is greater than the internal diameter of the inner thread 15 into which the adjustment screw 3 is to be screwed. When such an adjustment screw 3, modified with a radial oversize and radially compressible in the region of the slit 18, is screwed into the associated inner thread 15, there is likewise always a pretensioning present on account of the radial spring elasticity, and therefore a thread play that is initially present is completely compensated.

Since the main element of the adjustment device 2 is the radially elastic adjustment screw 3 which, on account of the radial spring elasticity, ensures a reliable wedging of the adjustment screw 3 free of play in the associated inner thread 15, it is also possible, according to an alternative embodiment, that the connection between the two components to be adjusted relative to each other, namely the carrier 4, having the optical component, and the other component 5 of the optical instrument, is provided solely by means of the adjustment screw 3, i.e. without the connection screw 7 shown in FIG. 1.

In this alternative embodiment of the adjustment device 2, it is necessary that the adjustment screw 3 can on the one hand be fixed with clamping in the carrier 4 or the other component 5 by means of the radial spring elasticity, while the screw tip 16 of the adjustment screw 3 is connected to the other component 5 or carrier 4, forming the abutment, such that the adjustment screw 3, seen in the longitudinal direction of the adjustment screw 3, is connected rigidly to this component forming the abutment, while at the same time this nonetheless permits a rotation of the adjustment screw 3 about its longitudinal axis, in order to be able to set the desired pivot angle α.

In this embodiment, the adjustment screw 3 is for example provided with two outer threads 14 set spatially apart from each other in the longitudinal direction of the adjustment screw 3, namely one in the region of the screw head 17, for securely clamping in the inner thread 15, and one in the region of the screw tip 16, for screwing into a threaded bush in the component forming the abutment. This threaded bush in turn then has to be mounted rotatably in the associated component.

Alternatively, a spring element could be provided in the region of the pivot axis 6 between the other component 5 and the carrier 4, said spring element pretensioning the carrier 4 in the direction of the component 5.

An adjustment device 2 or device arrangement 1 configured as described above is distinguished by the fact that, on account of the radial spring elasticity of the adjustment screw 3, it is ensured that the optical components that are to be adjusted are permanently in an exact position and free of play.

We claim:

1. An adjustment device for adjusting optical components of an optical instrument, the adjustment device comprising:

an adjustment screw and a carrier, the adjustment screw configured to arrange the optical component on the carrier so as to fix the optical component in an exact position relative to another component of the optical instrument; and wherein the adjustment screw, includes a screw head and a shaft, the shaft having an outer thread, the adjustment screw further including a slit extending from the screw head into the shaft in a longitudinal direction, the slit having a first end opposite a second end, the first end is open and disposed at the screw head and the second end is closed by the shaft, the slit providing a spring elasticity in a radial and outward direction, seen in cross section, relative to the longitudinal direction such that the adjustment screw is able to be fixed by being clamped with its outer thread in an inner thread of the carrier or of the other component, and the adjustment screw is mounted with a screw tip on the other component or the carrier.

2. The adjustment device as set forth in claim 1, wherein the slit is open radially outwardly on at least one side.

3. The adjustment device as set forth in claim 2, wherein the slit is configured as a straight or an angled slit.

4. The adjustment device as set forth in claim 2, wherein the slit is two intersecting slits that are formed in the adjustment screw.

5. The adjustment device as set forth in claim 2, wherein the slit is open radially outwardly on at least two sides.

6. The adjustment device as set forth in claim 2, wherein a diameter of the adjustment screw in a region of the slit is greater than an internal diameter of the inner thread into which the adjustment screw is able to be screwed.

7. A device arrangement for adjusting optical components of an optical instrument, having an adjustment device as set forth in claim 1, wherein the carrier, on which the optical component is arranged, and the other component of the optical instrument, with respect to which the optical component is able to be fixed in an exact position, are arranged to be pivotable relative to each other; and wherein the carrier and the other component are connected to each other via a connection screw, wherein the connection screw is mounted with a screw-head end in a through-bore in the carrier or the other component and is screwed with a screw-tip end into an inner thread of the other component or of the carrier, and the screw head of the connection screw is supported on the carrier or on the other component via a spring element disposed between the screw-head and the carrier or the other component, and wherein the adjustment screw is screwed with its outer thread into an inner thread in the component of the optical instrument provided with the through-bore for the connection screw, namely the carrier or the other component, and bears with its screw tip on the other component or the carrier.

8. The adjustment device as set forth in claim 1, wherein the slit tapers from the first end to the second end so as to change a radial tension applied by the adjustment screw relative to a depth in which the adjustment screw is threaded into the inner thread of the carrier.

* * * * *